United States Patent [19]

Gutzeit

[11] Patent Number: 5,183,317
[45] Date of Patent: Feb. 2, 1993

[54] TRACTION CONTROL BRAKING SYSTEM WITH A PISTON STORAGE UNIT CONNECTED TO A RESERVOIR AND PUMP

[75] Inventor: Reinhard Gutzeit, Stuttgart, Fed. Rep. of Germany

[73] Assignee: Robert Bosch GmbH, Stuttgart, Fed. Rep. of Germany

[21] Appl. No.: 702,535

[22] Filed: May 20, 1991

[30] Foreign Application Priority Data

Jun. 27, 1990 [DE] Fed. Rep. of Germany ....... 4020450

[51] Int. Cl.$^5$ ............................................. B60T 13/14
[52] U.S. Cl. .............................. 303/113.2; 303/116.2; 303/116.1
[58] Field of Search ...... 303/116 R, 115 EC, 116 SP, 303/113 TR

[56] References Cited

U.S. PATENT DOCUMENTS

| | | | |
|---|---|---|---|
| 4,714,300 | 2/1987 | Heess et al. | 303/115 EC X |
| 4,846,532 | 7/1989 | Friedow et al. | 303/113 TR |
| 4,927,213 | 5/1990 | Burgdore | 303/113 TR X |
| 5,033,800 | 7/1991 | Willmann | 303/116 R X |

Primary Examiner—Robert J. Oberleitner
Assistant Examiner—Josie A. Ballato
Attorney, Agent, or Firm—Edwin E. Greigg; Ronald E. Greigg

[57] ABSTRACT

A hydraulic dual-circuit brake system for motor vehicles comprising an antilock system (ABS) and an antispin control system (ASR) a four-duct hydro unit with control valves and a return pump with two separate pump elements for each brake circuit. An active piston storage unit is provided to supply brake pressure during ASR operation and each brake circuit containing at least one drive wheel is separable from a main master brake cylinder by means of a stop valve. The piston storage unit replaces the usual storage chamber at the input of a dual pump element provided for the brake circuit of the drive wheels and is activated at the beginning of anti-spin operation and is thereby filled with brake fluid from the brake fluid container. The piston storage unit is then de-activated such that the storage spring becomes operative and brake fluid is supplied via the storage piston into the pump element connected to the piston storage unit.

9 Claims, 3 Drawing Sheets

TRACTION CONTROL BRAKING SYSTEM WITH A PISTON STORAGE UNIT CONNECTED TO A RESERVOIR AND PUMP

The present invention relates to a hydraulic dual-circuit braking system comprising an antilock brake system (ABS) and anti-spin control system (ASR) for vehicles.

In a known dual-circuit brake system of this type comprising front/rear axle brake-circuit distribution, when not in the ASR mode of operation, activation of the brake fluid storage unit results in its storage chamber being filled with brake fluid from a brake fluid reservoir which is disconnected from the pump unit connected in circuit therewith by a 2/2-way valve located in its starting position. During ASR operation the 2/2-way valve is switched into its open position simultaneously with the stop valve and thus the filled storage chamber is connected with the input of the pump unit of the return pump. The return pump is simultaneously switched on. Brake fluid is drawn from the storage chamber into the non-self-priming pump unit which, in turn, produces a high, virtually constant, brake supply pressure which influences the control valves of the rear wheel brake cylinders. The amount of braking pressure needed in the relevant brake cylinder to arrest a slipping wheel is regulated by switching the control valve associated with said wheel brake cylinder (German patent 38 00 854, now U.S. Pat. No. 4,846,532).

OBJECT AND SUMMARY OF THE INVENTION

An advantage of the dual-circuit braking system is that the storage piston drive is only activated according to the invention during ASR operation, and the 2/2-way valve provided between the storage chamber and the pump unit in the known brake system can be eliminated. As soon as slippage is sensed, the storage unit drive is activated thereby pushing the piston contrary to the force of a spring. As the volume of the storage chamber increases, a negative pressure is produced therein. As a result, brake fluid is unable to flow from the pressureless brake fluid container into the storage chamber. The relief valve located in the connection between the storage chamber and the brake fluid container has a low opening time, e.g., of 0.5 bar and does not prevent the inflow of brake fluid. When the storage unit has filled, the stop valve is reversed, the return pump engaged and the piston-drive is de-activated. The brake fluid is supplied to the pump element of the return pump under the pressure produced by the storage unit spring. The pump, in turn, takes over the brake supply function in the conventional manner. The storage chamber also renders superfluous the low pressure storage unit located in the conventional brake system at the input of the pump element in the wheel brake circuit.

If the brake fluid volume stored in the storage chamber of the piston storage unit is insufficient to generate a sufficiently high brake pressure, the storage piston can effect a further stroke by reactivating the drive. Pressure reduction in the wheel brake cylinders at the end of ASR operation is achieved by switching the control valves to a pressure relief mode. As a result, the storage chamber of the piston storage unit is able to receive the quantities of brake fluid flowing from the wheel brake cylinders. The control valves and the stop valve are then de-energized and the associated pump element returns the brake fluid to the main brake cylinder. This ensures that the storage chamber of the piston storage unit is also empty thereby enabling more rapid pressure reduction in the event of possible subsequent ABS operation. If the capacity of the storage chamber is inadequate to hold the volume of fluid flowing from the wheel brake cylinders, the stop valve can be returned to its open position.

According to a preferred embodiment of the invention, the storage piston drive comprises an electromagnet and the storage piston constitutes the armature of the electromagnet.

In a preferred embodiment of the invention, a relief valve is provided with its blocking direction directed towards the main brake cylinder. When the stop valve is moved into its blocking position, the relief valve becomes effective in the connection line between the main brake cylinder and the brake circuit connected therewith. This relief valve permits braking via the main brake cylinder at all times during ASR operation.

BRIEF DESCRIPTION OF THE DRAWING

The drawing shows an embodiment of the invention which will be described in more detail hereinafter.

DESCRIPTION OF THE PREFERRED EMBODIMENT

Figure 1:
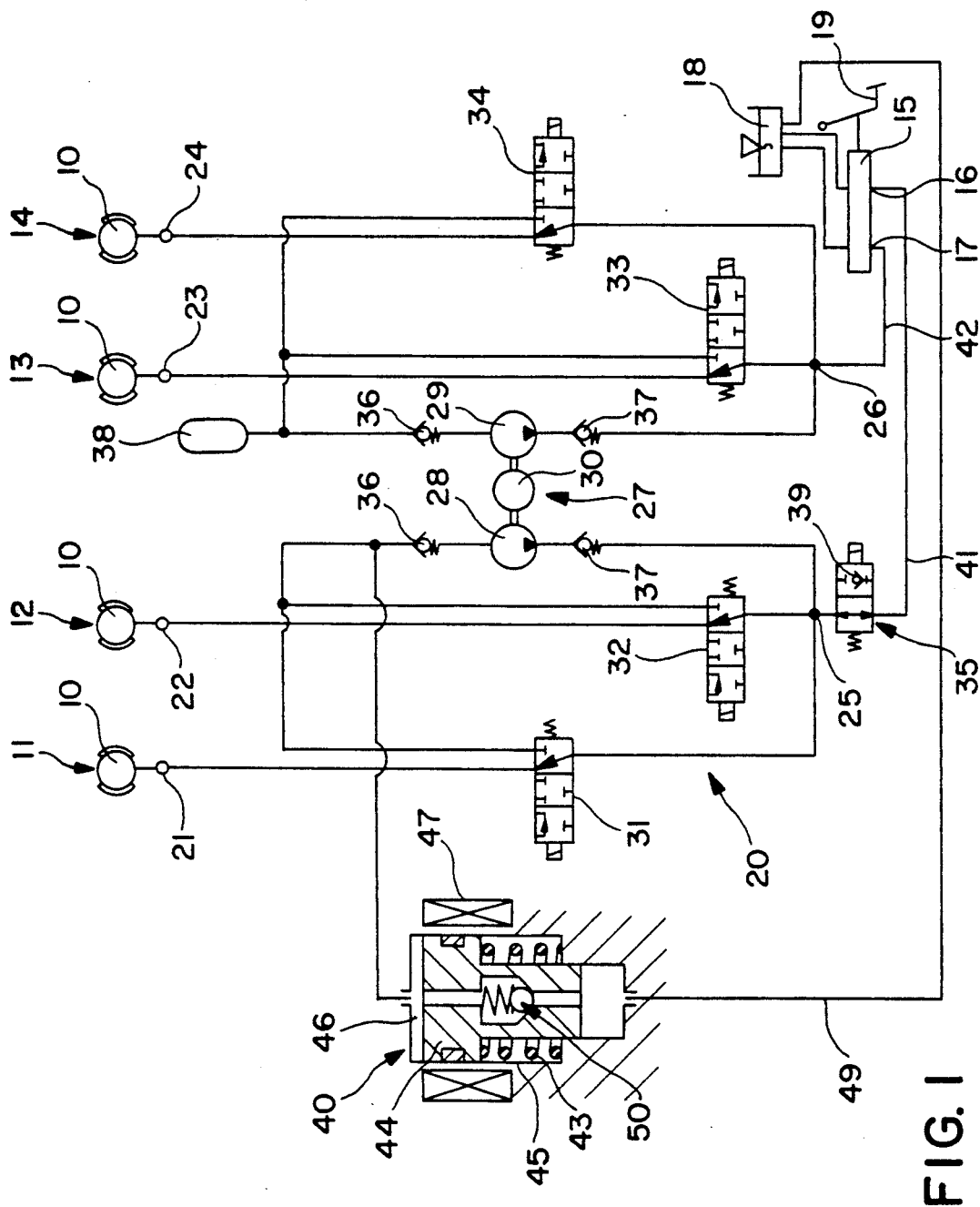
FIG. 1 is a schematic drawing of a passenger vehicle dual-circuit brake system comprising an antilock system, anti-spin control system and front/rear axle brake circuit distribution.

The hydraulic dual-circuit brake system for passenger vehicles shown in schematic form in FIG. 1 comprises front/rear or front axle/rear axle or diagonally-split brake circuit distribution, controlled by an antilock system (ABS) and anti-spin control system (ASR), the latter is also known as a propulsion control. The wheel brake cylinders 10 of the drive wheels 11,12 are located in one circuit and the wheel brake cylinders 10 of the non-driven wheels 13,14 are located in the other brake circuit. The drive wheels 11,12 are generally the rear wheels of a passenger vehicle. The dual-circuit brake system is provided in a known manner with a main brake master cylinder 15 which comprises two separate brake circuit outputs 16,17 for connecting each of the two brake circuits and which is connected to a brake fluid supply container 18. When a brake pedal 19 is activated, an equal brake pressure is recorded at the two brake circuit outputs 16,17.

The dual-circuit brake system also comprises a four-duct hydro unit 20 having four outlet ducts 21-24 and two inlet ducts 25 and 26. A wheel brake cylinder 10 of the wheels 11-14 is connected to each outlet duct 21-24. The inlet duct 25 is connected via a first connection line 41 to the brake circuit output 16 and the second inlet duct 26 is connected via a second connection line 42 to the brake circuit output 17 of the main brake cylinder 15. A plurality of control valves 31-34 each comprising a 3/3 way magnetic valve with spring resetting is provided for each output duct 21-24. The control valves are controlled by any well known electronic control unit (not represented) and are used to engage wheel skid-dependent brake pressures in the associated brake cylinders 10. A return pump 27 which is part of the four-duct hydro unit 20 comprises two pump elements 28,29 driven by an electromotor 30. The pump elements 28,29 are used to return brake fluid during pressure reduction in the brake cylinders 10. One pump element 28,29 is operative in a given brake circuit and is connectable on the input side with the wheel brake cylinders 10 of the vehicle wheels 11–14 via the two control valves 31,32 or 33,34 provided for the same brake circuit and is connected on the output side to an inlet duct 25 or 26 of the four-duct hydro unit 20. A pump inlet one-way valve 36 and pump outlet one-way valve 37 are arranged before and after each pump element 28,29. A low-pressure storage unit 38 is connected to the pump element 29 in the brake circuit of the non-driven wheels 13,14 and a piston storage unit 40 is connected to the pump element 28 in the brake circuit of the drive wheels 11,12; in each case on the input side of the inlet valves 36. The control valves 31–34 are connected by their first valve connection in pairs to the inlet ducts 25,26 associated with one particular brake circuit, by their second valve connection with the relevant outlet duct 21–24 and by their third valve connection in pairs to the inlet valves 36 of the pump elements 28,29. The control valves 31–34 are of a conventional design such that in their first de-energized starting position there is unimpeded fluid passage from the inlet ducts 25,26 to the outlet ducts 21–24 whereby the brake pressure regulated by the main brake master cylinder 15 passe into the wheel brake cylinder 10 of the vehicle wheels 11–14. In the second median valve position attained by exciting the control valves 31–34 at half maximum current, the fluid passage to the wheel cylinder is blocked and all the valve connections are shut off, thereby maintaining the brake pressure accumulated in the wheel brake cylinders 10 constant. In the third and final valve position which is obtained by valve energization at maximum current, the output ducts 23 and 24 for the wheel brake cylinders 10 of the wheels 13 and 14 are connected to the low pressure storage unit 38, and the output ducts 21 and 22 for the wheel brake cylinders of the wheels 11 and 12 are connected to the piston storage unit 40 such that brake fluid can flow from the wheel brake cylinders 10 into the storage units 38 or 40 and can then be pumped back to the main brake cylinder 15 by the pump elements 28,29 via the inlet ducts 25,26.

The four-duct hydro unit 20 together with the control electronic unit (not shown) form the antilock protection system whose components are also used for anti-spin control. Accordingly, a stop valve 35 is provided in the connection line 41 between the brake circuit output 16 of the main brake cylinder 15 and the inlet duct 25 of the four-duct hydro unit 20, to which the brake circuit of the drive wheels 11,12 is connected. The stop valve 35 consists of a 2/2 way magnetic valve with spring resetting which, in its reversed position, blocks the connection line 41. As a result, during antilock operation the brake circuit of the drive wheels 11,12 is disconnected from the main brake cylinder 15. A relief valve 39 can also be incorporated in the stop valve 35. During ASR operation, when the stop valve 35 is reversed, the relief valve 39 within stop valve 3 becomes effective in the connection line 41 with the flow direction directed towards the brake circuit of the drive wheels 11,12. As a result of this relief valve 39, during ASR operation, the brake circuit of the drive wheels 11,12 is disconnected afterwards as before from the main brake cylinder 15 but a braking action can be initiated in the brake circuit of the drive wheels 11,12 by the main brake cylinder 15 during ASR operation via the relief valve 39. The piston storage unit 40 designed as an active storage unit comprises a storage piston 44 loaded by a spring 43. The piston 44 is guided in an axially displaceable manner in a storage cylinder 45 and on its front side, together with the cylinder 45, it defines a storage chamber 46. The storage piston 44 is driveable into axial displacement by means of an electromagnet 47 symbolized here by its coil winding. Similarly, the piston 44 can be driven by an electromotor, compressed air or by a vacuum. The storage chamber 46 is connected via the pump inlet valve 36 to the pump element 28 and via a fill line 49 to the brake fluid container 18 and a one-way relief valve 50 with its flow direction directed towards the storage chamber 46 is connected in the said connection.

Figure 2:
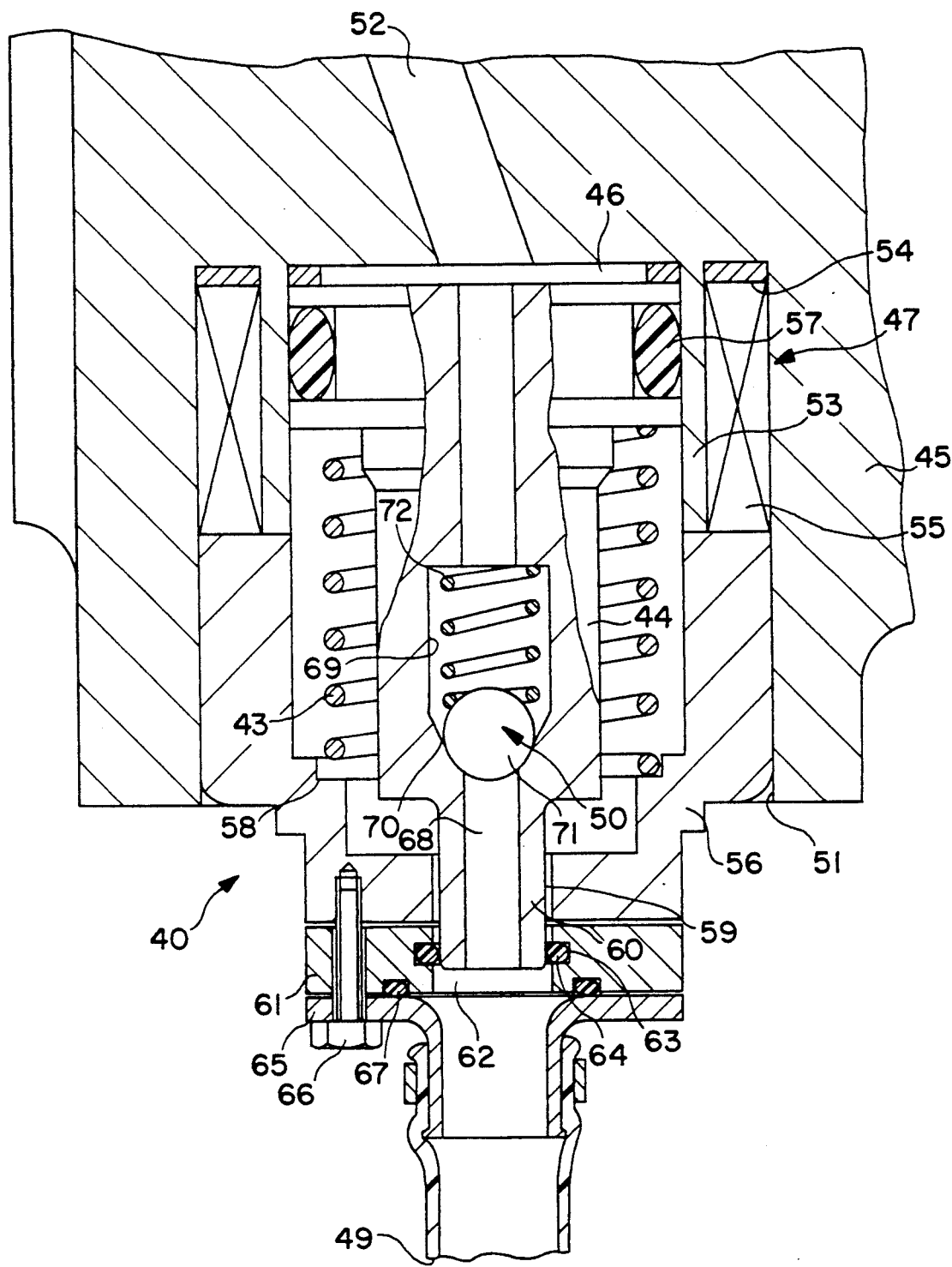
FIG. 2 is an enlargement of a longitudinal section of a piston storage unit in the schematic diagram of FIG. 1.

The longitudinal section shown in FIG. 2 provides design details of the piston storage unit 40. A blind hole-type recess 51 is provided in the storage cylinder 45. At the base of the recess 51 there opens a connection bore 52 which is to be connected to the one-way inlet valve 36. From the base of the recess 51 projects an annular piece 53 which is integral with the storage cylinder housing and together with the latter forms an annular groove 54 in which rests the cylindric coil-type exciter winding 55 of the electromagnet 47. The exciter winding 55 is mechanically secured in the annular groove 54 by means of a cup-shaped cap 56 which is inserted in the recess 51 and is supported on its front side on the annular piece 53. The storage piston 44 is guided in an axially displaceable manner on the inner face of the annular piece 53 and is sealed with respect to the latter by means of an annular seal 57 such that the storage chamber 46 defined by the storage piston 44 and the groove base of the recess 51 is sealed with respect to the inner space of the cap 56. The cap 56 bears an inner annular shoulder 58 on which rests the spring 43 that stresses the storage piston 44. The cap 56 is provided with a central guide bore 59, through which projects a reduced-diameter end 60 of the storage piston 44. A flange 61 comprising an inflow bore 62 coaxial to the guide bore 59 is attached by means of screws 66 to the cap 56. The end 60 of the piston 44 also projects into the inflow bore 62 and is sealed with respect to the wall of the inflow bore 62 by a seal 64 disposed in an annular groove 63 in the flange 61. The fill line 49 is connected to the inflow bore 62. The fill line 49 is attached by a connection plate 65 and screws 66 to the front side of the flange 61. A flat seal 67 is provided between the plate 65 and the flange 61. The piston 44 has an axial bore 68 extending through it. The bore 68 comprises an extension 69 in which is formed a valve seat 70 for a spherical valve member 71 of the one-way relief valve 50. The valve member 71 is pressed by a restoring spring 72 onto the valve seat 70 and blocks the passage from the storage chamber 46 to the fill line 49. The relief valve opens at a pressure of less than 0.5 bar and opens the connection from the fill line 49 to the storage chamber 46.

During ASR operation the storage piston 44 is moved by the electromagnet 47 contrary to the force of the spring 43 into the lower position whereupon the volume of the storage chamber 46 increases and low pressure prevails therein. As a result of the low pressure, brake fluid can now flow from the pressure-less brake fluid container 18 via the fill line 49 and the relief valve 50 into the storage chamber 46. When the storage chamber 46 has filled, the electromagnet 47 is de-energized and the stop valve 35 is simultaneously switched to its reverse position, thereby disconnecting the brake circuit of the drive wheels 11,12 from the main brake cylinder 15. The electromotor 30 of the return pump 27 is also switched on. Brake fluid is dispensed from the storage chamber 46 under the pressure of the spring 43 and is fed via the pump one-way inlet valve 36 into the pump element 28 of the return pump 27. The pump element 28 produces a high brake pressure which is in excess of the maximum pressure recorded in the wheel brake cylinders 10 of the drive wheels 11,12. If, for example, the drive wheel 11 is subject to spinning, the control valve of the wheel 12 which is not slipping is moved into the middle valve position such that the outlet duct 22 is closed to the brake pressure supply. Brake pressure is then increased via the other control valve 31 in the wheel brake cylinder 10 of the spinning drive wheel 11 which is then decelerated. The requisite brake pressure is engaged by pressure modulation obtained by switching the control valve 31. When both drive wheels 11,12 are subject to spinning, brake pressure modulation is achieved by switching the two control valves 31,32 to and fro between the valve starting position and the valve middle position.

At the end of ASR operation, if the spinning driving wheel has been sufficiently decelerated that no further spinning is detected, the control valve 31 is switched upon pressure release into its end position. As a result, the storage chamber 46 is able to receive the quantities of brake fluid flowing from the brake cylinders 10 of the drive wheel 11. The control valve 31 and the stop valve 35 are de-energized such that both return to their respective starting positions shown in FIG. 1. The quantity of brake fluid is discharged from the storage chamber 46 under the pressure of the restoring spring 43 and is returned to the main brake cylinder 15 by the pump element 28 of the return pump 27 via the stop valve 35. After the storage chamber 46 has been emptied, the return pump 27 is stopped.

If, during ASR operation, the amount of brake fluid contained in the storage chamber 4 is insufficient to obtain the necessary brake pressure in the wheel brake cylinders 10, a further storage piston stroke can be produced by re-activating the electromagnet 47. The low pressure resulting in the storage chamber 46 from the piston stroke causes brake fluid to flow again from the brake fluid container 18 into the storage chamber 46. The brake fluid is then used again to supply the pump element 28. If, by contrast, the amount of brake fluid flowing from the wheel brake cylinders 10 during brake pressure reduction cannot be fully held by the storage chamber 46, the stop valve 35 is returned to its starting position and the brake fluid is returned to the main brake master cylinder 15.

Figure 3:
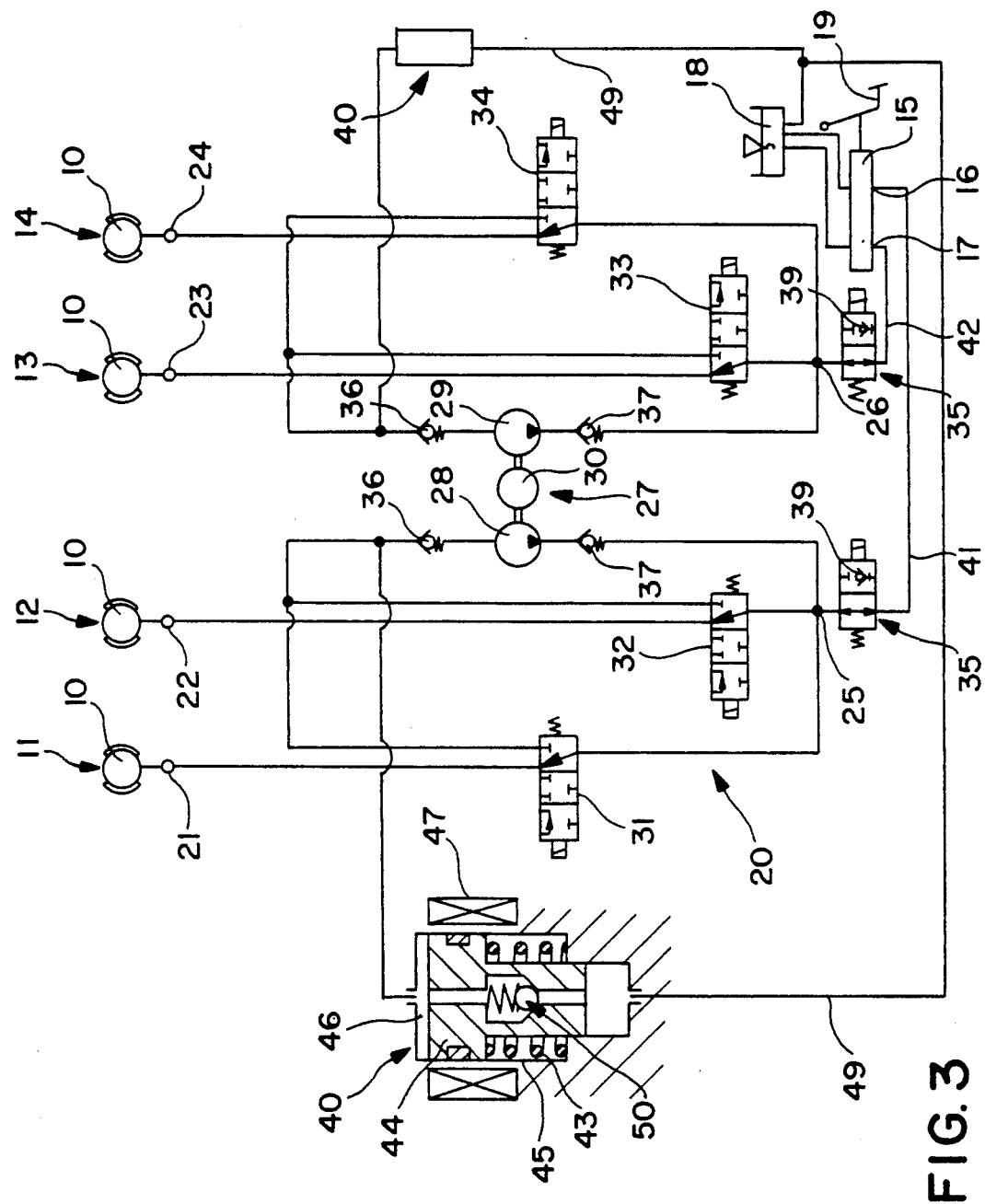
FIG. 3 is a schematic drawing of a dual circuit brake system illustrating a stop valve in each connection line between a pump outlet and a brake fluid supply container.

The invention is not limited to the embodiment which has been described. In a dual-circuit brake system comprising diagonal brake circuit distribution as shown in FIG. 3, the low pressure storage unit 38 is also replaced by a similar piston storage unit 40. A further stop valve 3 will also be provided in the connection line 42 between the brake circuit output 17 of the main brake cylinder 15 and the input 26 of the hydro unit 20.

If the storage piston 44 is made of a non-magnetic material such as aluminum, an iron core is inserted in the front part of the storage piston 44 defining the storage chamber 46. The core may be attached to the storage piston 44, for example, by adhesion. The iron core then forms the armature of the electromagnet 47.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic dual-circuit brake system for motor vehicles having vehicle wheels with wheel brake cylinders comprising an antilock system and anti-spin control system, comprising a brake pedal and a main master brake cylinder for regulating brake pressure through brake pedal activation; said main master brake cylinder comprising two separate brake circuit outputs and being connected to a brake fluid supply container; a four-duct hydro unit (20) including two brake circuits connected to the two brake circuit outputs; said four-duct hydro-unit comprising four outlet ducts (21-24) distributed in the two brake circuits and connected with the wheel brake cylinders of the vehicle wheels, at least one control valve provided for each outlet duct to regulate a wheel-spin-dependent brake pressure to the wheel brake cylinders which are connected both to an individual outlet duct and also in pars via individual connection liens to a brake circuit output of the main brake cylinder, a return pump with two separate pump elements, each of said two separate pump elements operating in one particular brake circuit to return brake fluid from the wheel brake cylinders during brake pressure reduction; an input side of each of said two pump elements being connected with said wheel brake cylinders and the outlet ducts belonging to one particular brake circuit via the control valves and connected to an output side of each of said two separate pump elements with said output side connected via one of the connection lines with the main master brake cylinder brake circuit output associated with that brake circuit, at least one device for providing a brake supply pressure during a spin control; said at least one device comprising a stop valve (35) in at least one connection line between one brake circuit output and the output of one of said two separate pump elements associated with a brake circuit with at least one drive wheel; said stop valve separating the at least one brake circuit from the main master brake cylinder during anti-spin control operation; at lest one piston storage unit (40) for supply brake fluid to said one of said two separate pump elements, said at least one piston storage unit comprising a storage piston displaceable in a storage cylinder, a drive for driving the storage piston (44) in axial displacement contrary to a force of a spring (43) and a storage chamber (46) defined by the storage piston; said storage chamber being directly connected to a brake fluid supply container (18) via a one-way relief valve (50), and the storage chamber (46) of the at least one piston storage unit (40) is permanently connected to the input of said one of said two separate pump elements (28) and that at the beginning of the anti-spin control operation, the storage piston drive (47) is activated to produce a storage piston stroke to fill the storage chamber (46) with fluid form said brake fluid supply container (18) whereby the force of the spring (43) of the piston (44) is moved to charge said one of said two storage pump elements (28) so that said one of said two pump elements generates a necessary brake pressure required for compensating for spinning of the wheel.

2. A brake system as claimed in claim 1, in which said on of said two pump elements (28) is connected on an input side to a connection bore (52) that opens on a front side int he storage chamber (46) and that a fill connection line (49) which runs directly from the brake fluid supply container (18) is connected with a bore (68) of said at least one piston storage unit that axially penetrates the piston (44) and in which the one-way relief valve (50) is disposed.

3. A brake system as claimed in claim 2, in which the storage piston drive comprises an electromagnet (47) with an exciter winding (55) which encompasses the storage piston (44) with space therebetween and said storage piston (44) includes an armature of the electromagnet (47).

4. A brake system as claimed in claim 3, in which when the stop valve (35) is moved into a fluid blocking position int he connection lien (41) a one-way relief valve (39) whose blocking direction is directed towards the main brake cylinder (15) becomes operative.

5. A brake system as claimed in claim 2, in which when the stop valve (35) is moved into a fluid blocking piston in the connection lien (41) a one-way relief valve (39) whose blocking direction is directed towards the main brake cylinder (15) becomes operative.

6. A brake system as claimed in claim 1, in which the storage piston drive comprises an electromagnet (47) with an exciter winding (55) which encompasses the storage piston (44) with space therebetween and said storage piston (44) includes an armature of the electromagnet (47).

7. A brake system as claimed in claim 6, in which when the stop valve (35) is moved into a fluid blocking position in the connection line (41) a one-way relief valve (39) whose blocking direction is directed towards the main brake cylinder (15) becomes operative.

8. A brake system as claimed in claim 1, in which when the stop valve (35) is moved into a fluid blocking position in the connection line (41) a one-way relief valve (39) whose blocking direction is directed towards the main brake cylinder (15) becomes operative.

9. A brake system as claimed in claim 1 wherein includes two devices for providing a brake supply pressure during a spin control, a stop valve (35) of each of said two devices in each of said connection liens between said separate brake circuit output in each separate brake circuit and each of said two separate pump elements in each of said two separate brake circuits, and the piston storage unit for supplying fluid form said fluid supply container to each of said two separate pump elements.

* * * * *